C. R. CASHION.
COTTON HARVESTING MACHINE.
APPLICATION FILED SEPT. 18, 1916.

1,217,408.

Patented Feb. 27, 1917.
3 SHEETS—SHEET 1.

WITNESSES
James F. Crown,
Ross J. Woodward

INVENTOR
Charles R. Cashion
BY Richard Owen,
ATTORNEY

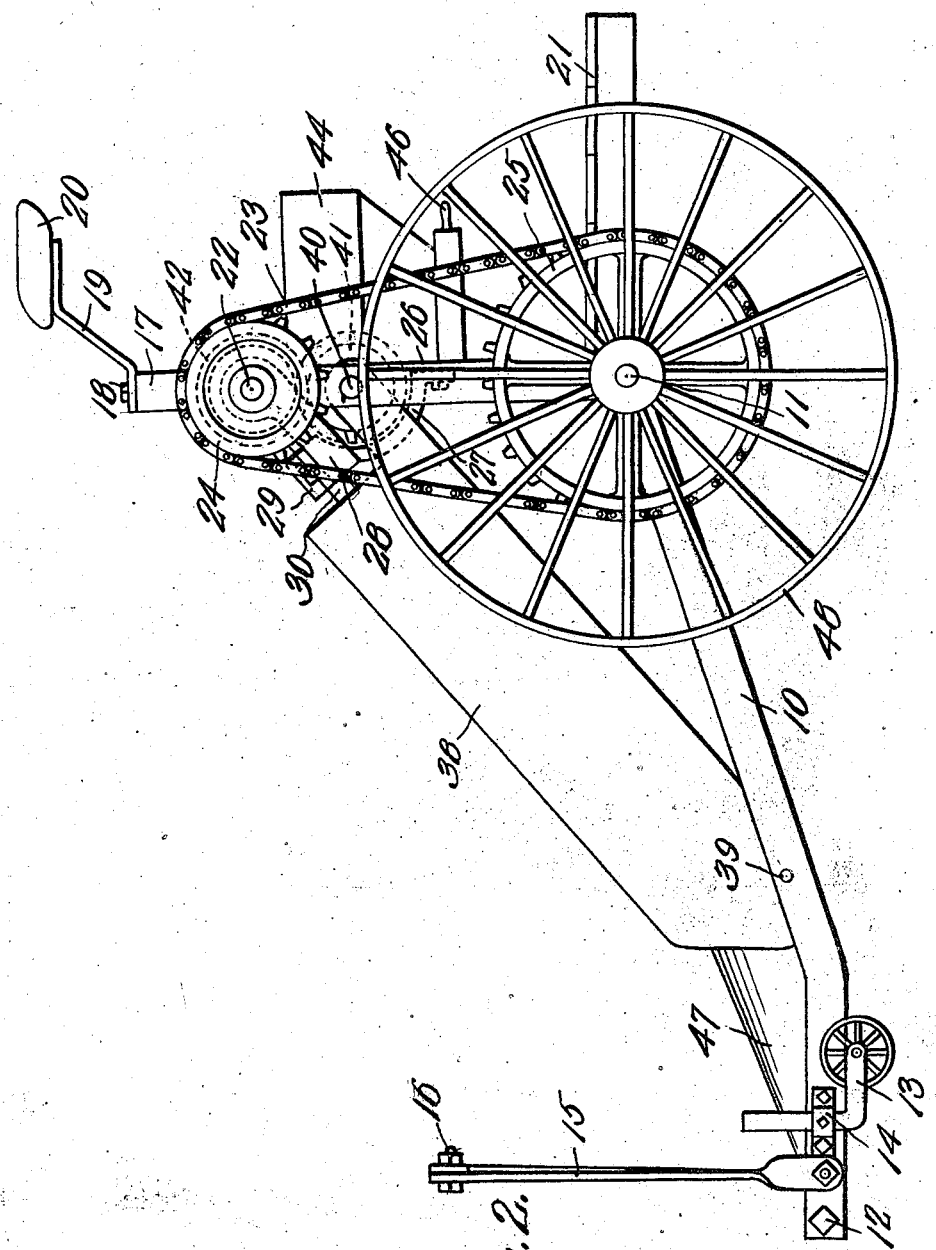

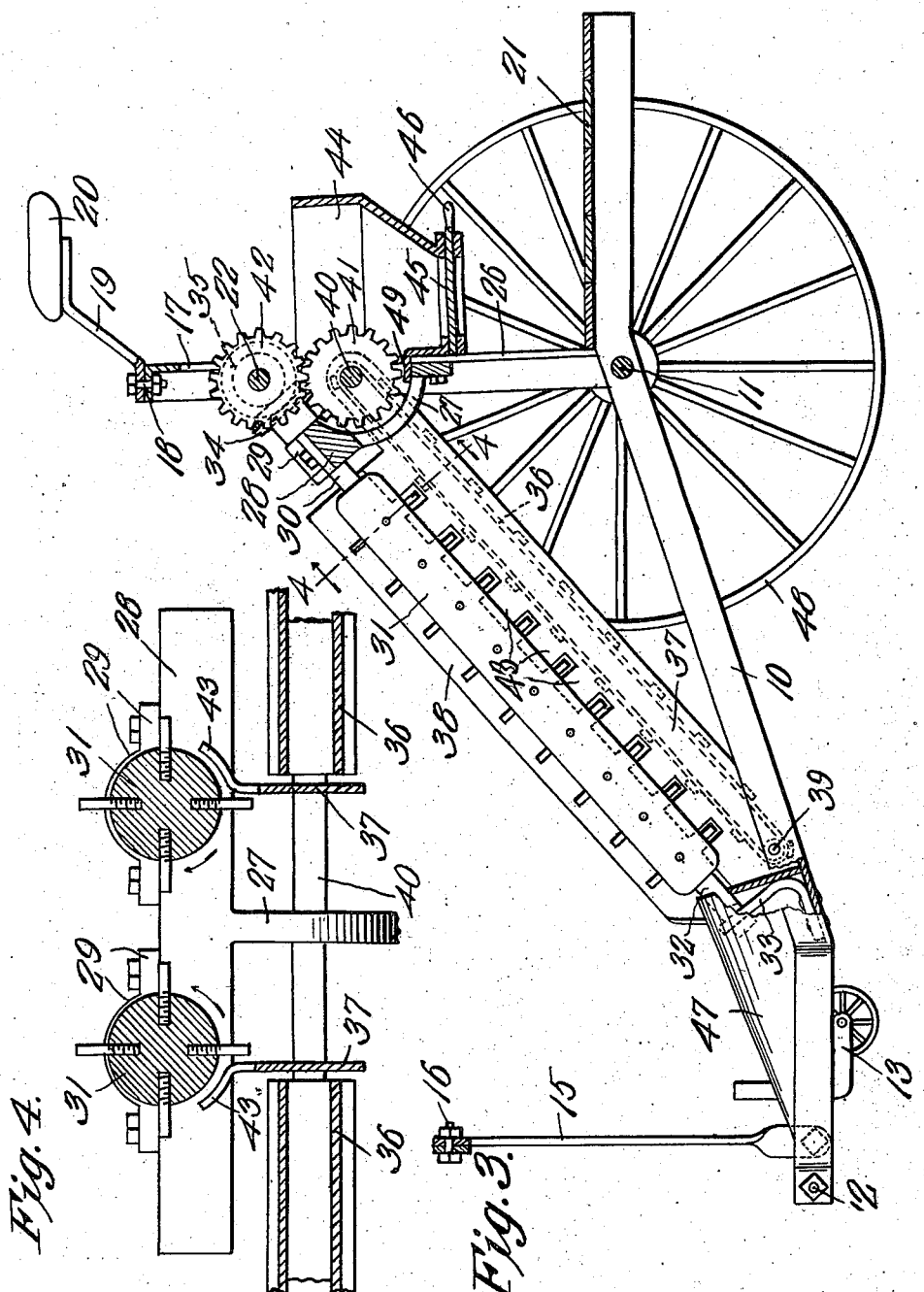

UNITED STATES PATENT OFFICE.

CHARLES R. CASHION, OF PURCELL, OKLAHOMA.

COTTON-HARVESTING MACHINE.

1,217,408.  Specification of Letters Patent.  Patented Feb. 27, 1917.

Application filed September 18, 1916. Serial No. 120,838.

*To all whom it may concern:*

Be it known that I, CHARLES R. CASHION, a citizen of the United States, residing at Purcell, in the county of McClain and State of Oklahoma, have invented certain new and useful Improvements in Cotton-Harvesting Machines, of which the following is a specification.

This invention relates to an improved cotton harvester and the principal object of the invention is to provide a cotton harvester so constructed that it may be drawn across a field along a row of cotton plants with the plants passing between rollers forming part of the harvester so that the rotating rollers will remove the cotton bolls from the plants and deposit them upon moving conveyers which will carry them to a hopper forming part of the machine.

Another object of the invention is to so construct this machine that it will pick cotton bolls from the lower portions of the plants as well as from the upper portions and to further so construct the machine that the bolls will be removed from the teeth of rollers and dropped upon the moving conveyers.

Another object of the invention is to so construct this machine that the rollers can be rotated from the rear axle and thus the rear axle constitute a driving shaft for the rollers.

Another object of the invention is to provide a machine of the character described which will be comparatively simple in construction, and consists of a few number of parts which will be strong and durable and not liable to easily get out of order.

This invention is illustrated in the accompanying drawings, wherein:—

Fig. 2 is a view showing the harvester in side elevation,

Fig. 3 is a vertical longitudinal sectional view through the harvester, and

Fig. 4 is a fragmentary sectional view taken along the line 4—4 of Fig. 3.

Figure 1:
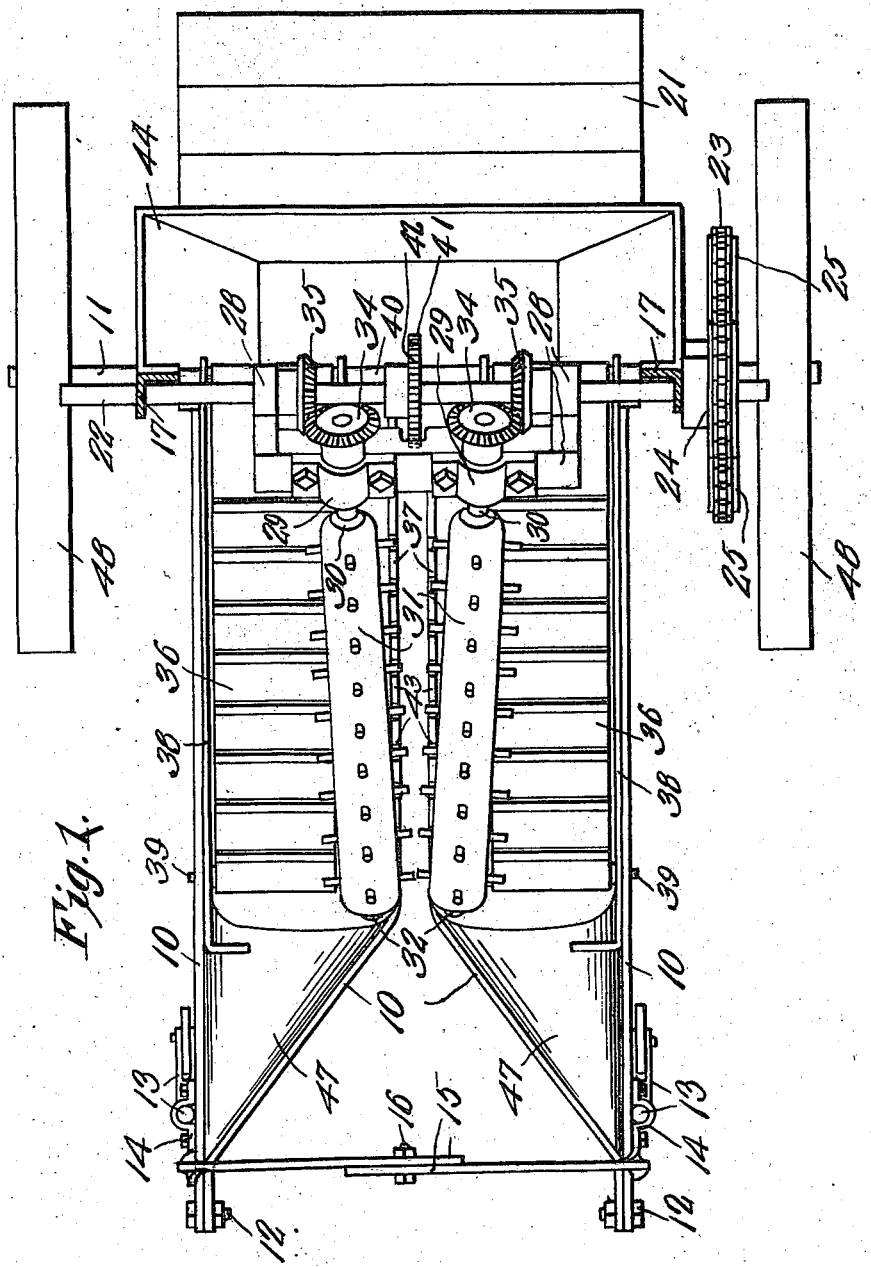
Figure 1 is a top plan view of the improved harvester.

The frame of this cotton picker includes longitudinally extending bars 10 which are slidably carried by the rear axle or driving shaft 11 and are connected at their forward ends in pairs by means of the bolts or other fasteners 12. Casters 13 are mounted in bearings 14 to support the forward end portions of these bars 10, the casters being rotatable in the bearings so that they may have sufficient movement to permit the machine to travel properly. A bracing yoke 15 which is formed in two sections adjustably connected by means of a bolt 16 is secured to the outer end portions of the outer arms 10 as clearly shown in the drawings and serves to brace the pairs of arms referred to and hold these sets of arms in the proper position thus preventing the rollers and conveyers, to be hereinafter described, from moving too close together or from spreading apart beyond the desired amount.

A rear wall or super-structure is positioned above the rear end portions of the bars 10 and includes side bars 17 which have their lower ends mounted upon the axle 11. These side bars are connected by an upper bar 18 to which the standard 19 of the seat 20 will be secured thus providing a convenient place for the driver of the harvester. It is of course, obvious that if desired, this seat could be positioned upon the platform 21 carried by the rear end portions of the bars 10. This super-structure or supporting frame carries a driven shaft 22 which is rotated from the axle or driving shaft 11 by means of the sprocket chain 23 passing around the sprocket wheels 24 and 25 mounted upon the driven shaft 22 and driving shaft 11 respectively. If desired, a train of gears could be substituted for the sprocket chains and sprocket wheels, this being simply shown as a conventional means for transmitting rotary movement from the driving shaft to the driven shaft. Cross braces 26 are provided for the side bars 17 of this supporting frame and serve not only to brace the side bars but also serve as means for carrying the bracing arms 27 of the bearing bracket 28. This bearing bracket has its arms mounted upon the driven shaft 22 and carries bearings 29 through which extends the stub-shaft 30 of the gathering rollers 31. These gathering rollers have their lower ends provided with stub-shafts 32 mounted in bearing brackets 33 carried by the inner bars 10 and as the stub shaft 30 carries gears 34 which mesh with gears 35 carried by the driven shaft 22, it will be readily seen that when this driven shaft is rotating the rollers will be rotated in the direction of the arrows in Fig. 4 thus causing the cotton bolls to be engaged by the teeth of these gathering rollers.

Between the inner and outer bars 10, there has been provided endless conveyers or aprons 36 which are positioned in troughs formed by the side plates 37 and 38 and pass around the rollers 39 and actuating shaft 40. This actuating shaft 40 is carried by the side bars of the supporting frame beneath the driven shaft 22 and not only serves as an actuating shaft for the endless conveyers 36 but also serves as supporting means for the upper ends of the side plates 37 and 38. A gear 41 is mounted upon this actuating shaft and meshes with a gear 42 carried by the driven shaft 22 so that when the machine is in motion, the aprons will be moved through the troughs, with the upper flights traveling upwardly. The upper edge portions of the side plates 37 are provided with teeth 43 between which the teeth of the gathering rollers will pass and therefore when this machine is in operation, cotton bolls which are gathered by the rollers and which may be hung upon the teeth of the rollers will be scraped off by these cleaning teeth 43 and will drop upon the conveyer belt. The cotton bolls will be carried upwardly and when they reach the upper ends of the conveyers, they will drop into the hopper 44 which is secured to the carrying frame by means of fasteners passing through the side bars 17 and is positioned above the platform 21 so that a receptacle could be placed upon this platform and filled from the hopper by simply moving the closure slides 45 to an open position through the medium of the actuating handles 46. If desired, the receptacle which might be a sack could be connected with the lower end of this hopper and the slides then opened thus permitting the cotton bolls to drop into the sack. At the lower ends of the conveyers, there has been provided hoods 47 which serve not only to prevent the cotton bolls from falling beyond the forward ends of the conveyer belts but also serve to guide the cotton plants to a position where they may pass between the troughs in operative relation to the gathering rollers. From an inspection of Fig. 1 it will be readily seen that by adjusting the bracing yoke 15 and sliding the bars 10 upon the axle 11 the rollers and troughs could be moved closer together or farther apart according to the size of the cotton plants.

When in use, the machine is moved across the field with the cotton plants passing between the guiding hoods 47 and between the rollers. The machine may be propelled either by power carried by the machine or may be drawn by animals, the draft appliance of which would be connected in any suitable manner. As the machine moves across the field, the driving shaft or axle 11 will be rotated by the wheels 48 and rotary motion will be transmitted from this axle to the driven shaft 22 and from the driven shaft to the rollers and to the apron shafts. The rollers will be rotated in the direction indicated by the arrows in Fig. 4 so that their teeth will remove the cotton bolls from the plants and these cotton bolls will drop upon the endless conveyers which will carry them upwardly and deposit them in the hopper 44. It should be noted that the forward wall of this hopper is provided with tongues 49 which extend beneath the endless conveyers and will prevent any danger of the cotton bolls dropping in front of the hopper and not into the hopper thus preventing waste by cotton bolls dropping upon the ground. The driver may occupy the seat 20 and a second operator may stand upon the platform 21 or if desired the operator and driver could both occupy the platform 20, one using a seat mounted upon the platform and the second standing thereon or if so desired, a single operator could occupy the platform and fill the receptacles from the hopper as well as driving the draft animals or looking after the driving engine and steering of the machine in case it is a self-propelled machine.

What is claimed is:—

1. A cotton harvesting machine comprising a frame including a super-structure and longitudinally extending bars, an axle constituting a driving shaft, the longitudinally extending bars being slidably mounted upon the axle, means connecting the forward end portions of the longitudinally extending bars to provide sets of longitudinally extending bars, a driven shaft rotatably carried by said super-structure, a conveyer actuating shaft rotatably carried by said super-structure, conveyer troughs carried by said frame between the longitudinally extending bars and super-structure, conveyer belts passing around said conveyer actuating shaft, rotatably mounted gathering means mounted in operative relation to the conveyer belts, means for transmitting rotary movement from said driven shaft to the conveyer actuating shaft, means for transmitting rotary movement from the driven shaft to the gathering means, and means for transmitting rotary movement from said driving shaft to said driven shaft.

2. A cotton harvesting machine comprising a frame including a super-structure and longitudinally extending bars, an axle constituting a driving shaft carried by the super-structure, the longitudinally extending bars being slidably mounted upon said axle, means connecting the forward end portions of said longitudinally extending bars to provide sets of bars positioned in spaced relation, hoods carried by the forward end portions of the sets of bars, a driven shaft rotatably carried by said super-structure, a conveyer actuating shaft rotatably carried by said super-structure, inner and outer side plates connected with the longitudinally extending bars, and having their upper end portions mounted upon said conveyer actuating shaft, conveyer belts passing between the inner and outer plates above said hoods and passing about said conveyer actuating shafts, rotatably mounted gathering rollers extending above said conveyer belts, means for transmitting rotary movement from said driven shaft to said conveyer actuating shaft, means for transmitting rotary movement from said driven shaft to said gathering rollers, and means for transmitting rotary movement from said driving shaft to said driven shaft.

3. A cotton harvesting machine comprising a frame including longitudinally extending bars having their outer end portions connected in pairs, a super-structure forming part of said frame, a conveyer actuating shaft rotatably carried by said super-structure, conveyer troughs including side walls having their lower end portions connected with the longitudinally extending bars, conveyer belts extending between the side walls and passing about said conveyer actuating shaft, means for releasably holding the pairs of side bars in relative transverse adjustment, a driven shaft carried by said super-structure, gathering rollers extending longitudinally of said conveyers and having transverse adjustment when the longitudinally extending bars are adjusted, means for transmitting rotary movement from said driven shaft to said rollers, and means for transmitting rotary movement from the driven shaft to the conveyer actuating shaft.

4. A cotton harvesting machine comprising a frame including a super-structure and supporting bars, an axle carried by said supporting bars and constituting a driving shaft, ground engaging supports connected with the forward end portions of the supporting bars for vertical adjustment, conveyer troughs carried by said frame between the supporting bars and super-structure, a conveyer actuating shaft carried by said super-structure, conveyers extending through said troughs about said conveyer actuating shaft, a receptacle carried by said super-structure, gathering means mounted in operative relation to said conveyers, and means for transmitting rotary movement from said axle to said gathering means and conveyer actuating shaft.

In testimony whereof I affix my signature in presence of two witnesses.

CHARLES R. CASHION.

Witnesses:
J. H. DYER,
J. N. CRANE.